(12) United States Patent
Button

(10) Patent No.: US 7,555,115 B2
(45) Date of Patent: Jun. 30, 2009

(54) ENHANCED CALL QUEUING SYSTEM

(75) Inventor: Gavin Paul Button, Berkshire (GB)

(73) Assignee: Panasonic Corporation, Osaka (JP)

( * ) Notice: Subject to any disclaimer, the term of this patent is extended or adjusted under 35 U.S.C. 154(b) by 162 days.

(21) Appl. No.: 10/547,210

(22) PCT Filed: Feb. 23, 2004

(86) PCT No.: PCT/GB2004/000723

§ 371 (c)(1),
(2), (4) Date: Jun. 15, 2006

(87) PCT Pub. No.: WO2004/077805

PCT Pub. Date: Sep. 10, 2004

(65) Prior Publication Data

US 2007/0036327 A1    Feb. 15, 2007

(30) Foreign Application Priority Data

Feb. 28, 2003   (GB)   .................................. 0304675.2

(51) Int. Cl.
H04M 3/00    (2006.01)
(52) U.S. Cl. ............................. 379/265.09; 379/266.03
(58) Field of Classification Search ............ 379/266.06, 379/265.01, 265.05, 266.01, 265.09, 266.03
See application file for complete search history.

(56) References Cited

U.S. PATENT DOCUMENTS

| | | | |
|---|---|---|---|
| 6,820,260 B1 * | 11/2004 | Flockhart et al. ............. | 717/173 |
| 6,871,322 B2 * | 3/2005 | Gusler et al. ................. | 715/708 |
| 7,231,035 B2 * | 6/2007 | Walker et al. ........... | 379/266.01 |
| 2002/0114442 A1 * | 8/2002 | Lieberman et al. ...... | 379/266.06 |
| 2002/0191775 A1 * | 12/2002 | Boies et al. ............. | 379/266.01 |
| 2003/0031309 A1 * | 2/2003 | Rupe et al. .............. | 379/265.02 |
| 2003/0108187 A1 * | 6/2003 | Brown et al. ............ | 379/266.03 |
| 2005/0207559 A1 * | 9/2005 | Shtivelman et al. ..... | 379/266.06 |

FOREIGN PATENT DOCUMENTS

EP      1 091 548 A2    4/2001

\* cited by examiner

*Primary Examiner*—Olisa Anwah
(74) *Attorney, Agent, or Firm*—RatnerPrestia

(57) ABSTRACT

In a computer controlled call answering system, if no agent is available to respond to an incoming call, a caller is provided with a form to complete during the waiting time. Forms of varying complexity may be stored and relayed to the caller depending on the anticipated waiting time. Additionally or alternatively, further forms having additional fields may be sent to the caller if the agent is not available following completion of a first form.

8 Claims, 3 Drawing Sheets

ENHANCED CALL QUEUING SYSTEM

The present invention relates to a queuing system and method for implementing it.

BACKGROUND

For the purpose of this document the user who calls into an automated call answering system (or call centre) will be referred to as the caller. The individual who answers queries of the caller will be known as the agent This system allows multimedia information such as forms to be exchanged between the caller and the automated answering system, prior to the caller speaking to an agent.

Automated Answering systems are becoming common place in today's society; they allow large companies to screen incoming calls and use queuing systems for callers waiting to speak to a customer agent. Once in a queue, callers can spend much time waiting for the call to be answered by an agent.

PRIOR ART AND RELATED PATENTS

WO0127791 describes a customer call system that is supplemented with a separate Internet based facility, which provides forms for customers' queries. The call system stores the customer data so that it can be retrieved for future use. This means that customer information does not need to be obtained again each time a customer calls. In this proposed system, the call system and Internet based facility are separate systems. Data entry, on the Internet system, is not linked to a call to an agent. It is a separate process. The same forms are supplied to all users.

EP1030504 discloses a web based call centre with multimedia interaction such as HTML forms, email, phone or fax. The agent makes uses of these different access methods to get rich information to the caller, such as sending the caller documents and interactively annotating them. The entering of data by methods such as HTML forms is done as a separate process, not linked to the initiation of a call. The entering of data by other methods such as HTML forms is not done whilst a caller waits to speak to an agent. The same forms are supplied to all users.

It would be advantageous to provide a call queuing system in which the exchange of forms is integrated with the call initiation process. Furthermore it would be useful to consider the supply of forms based on a prediction of when the call will be answered.

SUMMARY OF THE INVENTION

The present invention provides a method of handling calls in a computer controlled answering system as defined in annexed claim 1. Preferred features of this method are detailed in claims 2 to 7. The invention may be implemented as a software program on a software carrier as defined in claim 8. Preferred software features are detailed in the remaining claims.

This invention uses the waiting time to gather information from the user, by sending forms to be completed and returned during the waiting time, thus quickening the processing time of the call when the agent answers it. The system makes efficient use of the time waiting in the queue and also allows the agent to have information readily available when the call is answered. It should be implemented as an end-to-end integrated and automated solution.

The Session Initiation Protocol (SIP) has been defined by the Internet Engineering Task Force (IETF) as a way of setting up Internet Protocol (IP) based calls. The calls can be of varied types e.g. voice, video, chat or a game session. SIP has also been chosen by the $3^{rd}$ Generation Partnership Project (3GPP) as the approved protocol for setting up IP sessions within a $3^{rd}$ Generation (3G) system. The enhanced call queuing system uses SIP to control Voice over Internet Protocol (VoIP) calls.

BRIEF DESCRIPTION OF THE DRAWINGS

The operation of the system will now be described. Also, two example methods according to the invention will now be described by way of example only and with reference to the accompanying drawings in which.

DETAILED DESCRIPTION

The enhanced call queuing system to be described below integrates SIP call set-up for a VoIP call with a procedure for downloading forms to the caller, allowing collection of customer data prior to speaking to the call agent. Two example solutions are provided. Solution 1 is the put forward as the best example as it provides integrated call set-up and form exchange.

The enhanced queuing system is designed to operate in an IP telephony environment.

Operation of the System

Figure 1:
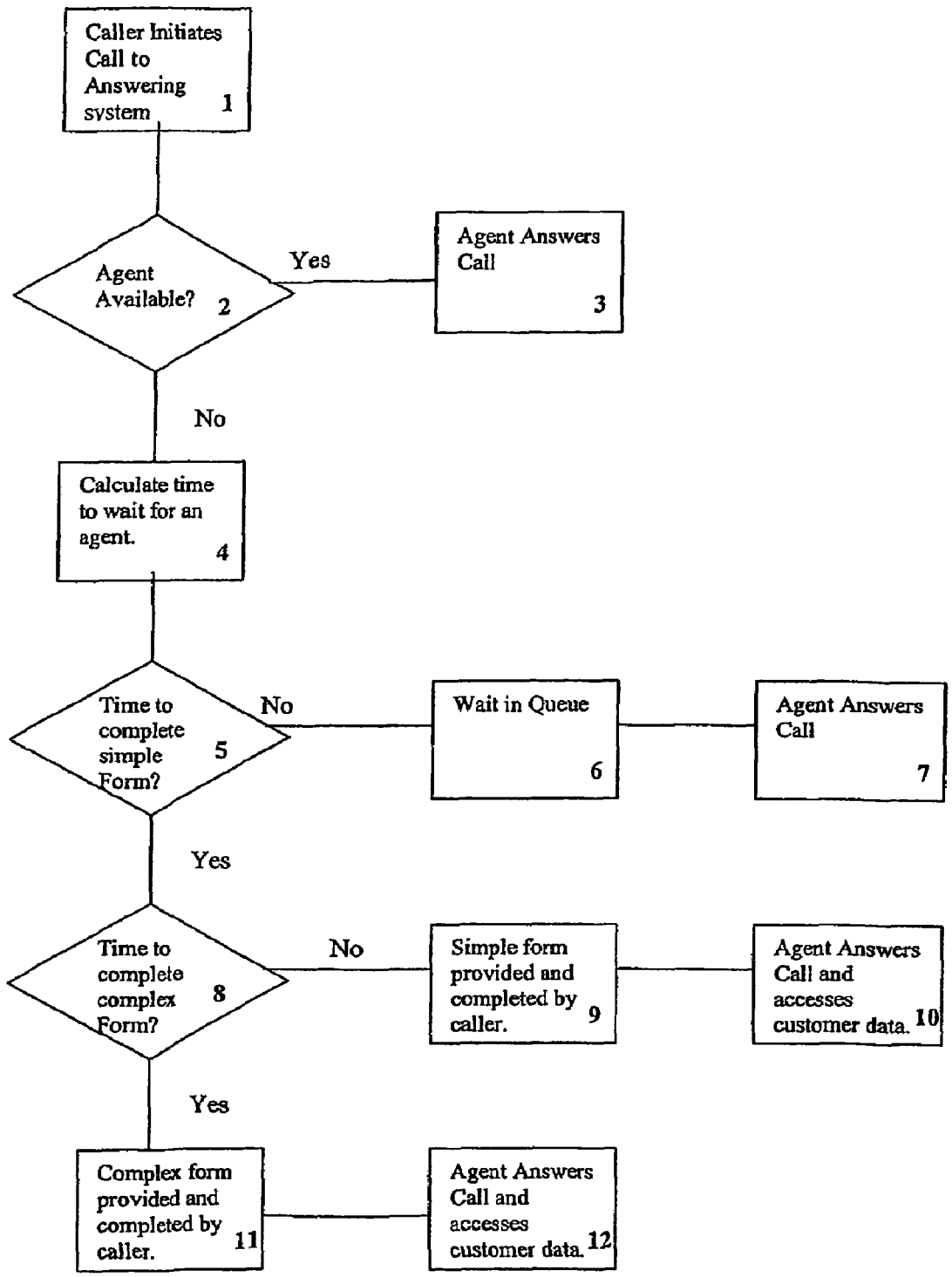
FIG. 1 is a flowchart illustrating a method according to the invention.

The preferred enhanced call queuing system according to this invention is a software enhancement to a call centre system. It becomes operational when the caller makes a call into the call centre, wishes to speak to the agent but the agent is not currently available. During the time the caller is waiting to talk to the agent, the caller may be provided with some forms to complete to assist with the call. The number and complexity of the forms sent will depend upon the predicted time before the call will be answered. The operation of the system is shown in FIG. 1 and is described below with reference to the numbered steps in the Figure.

1. A caller makes a call into the answering system; the call set-up also involves negotiating the ability to exchange forms. The caller selects that they wish to talk to an agent.
2. If an agent is available to answer the call go to 3, otherwise go to 4.
3. The agent answers the call, without any knowledge on the caller or their issue.
4. The call queuing system calculates the likely time before an agent is available. This could be calculated as follows:

If:
 l = Length of Queue
 o = Number of Operators
 a = Average operator time for dealing with a call
 T = Expected Agent Availability Time
Then:
 T = (l/o) * a A number of different forms could be available for the callers to complete regarding their issue. These forms may vary in their complexity, in this example we will have two forms. A simple form will include basic customer details (e.g. Name and product) and a more complex form will have space for a detailed problem description. For both forms an average completion time will be generated, in our example this is C1 for the simple form and C2 for the complex form.

5. If there is expected to be time to complete the simple form i.e. if the expected agent availability time is greater than the time to fill in the simple form (T>C1), then go to 8. Otherwise go to 6.
6. The caller waits in the queue until an agent is available.
7. The agent answers the call, without any knowledge on the caller or their issue.
8. If there is expected to be time to complete the complex form i.e. if the expected agent availability time is greater than the time to fill in the complex form (T>C2), then go to 11. Otherwise go to 9.
9. The simple form is provided to the caller. The caller then has the option of completing the form and posting the results to the answering system prior to the agent answering the call.
10. The agent answers the call. If the caller posted the form back the agent can investigate customer files on the caller or their issue, prior to answering the call.
11. The complex form is provided to the caller. The caller then has the option of completing the form and posting the results to the answering system prior to the agent answering the call.
12. The agent answers the call. If the caller posted the form back the agent can investigate customer files on the caller or their issue, prior to answering the call.

To support the functionality of the enhanced call queuing system, a data network, which can provide telephony services is required. The Internet Protocol (IP) is the most widely used protocol for providing data services. The Session Initiation Protocol (SIP) has been defined as a method of controlling IP sessions. SIP has been chosen by the $3^{rd}$ Generation Partnership Project (3GPP) protocol as the protocol for controlling 3rd Generation IP sessions including IP telephony calls.

SIP can interoperate with other protocols like the Real Time protocol (RTP) to provide a complete IP Telephony service With this in mind, two technical solutions are put forward for implementing the enhanced call queuing system.

Solution 1: SIP

This solution focuses on using SIP for providing an automated end-to-end solution. The basic SIP protocol as specified in the protocol definition document [1], defines a method for setting up SIP based IP sessions using the INVITE method. One of the extensions to the SIP protocol is an event notification method [2]. This can be used to provide additional information to the user when a specific event occurs. We propose defining a 'form' event that could be used to supply the caller with a form to be filled in. Before an event can be received the parties must negotiate support for the event, then the event must be 'Subscribed' for. In the example below, the form and answers to the form are provided in SIP methods. We extend the use of the Event Received 'Ok' response by the caller, to also include the results of the form they filled in. SIP is not designed for large amounts of additional data, so this solution should involve relatively small forms of a type such as HyperText Markup Language (HTML).

Figure 2:
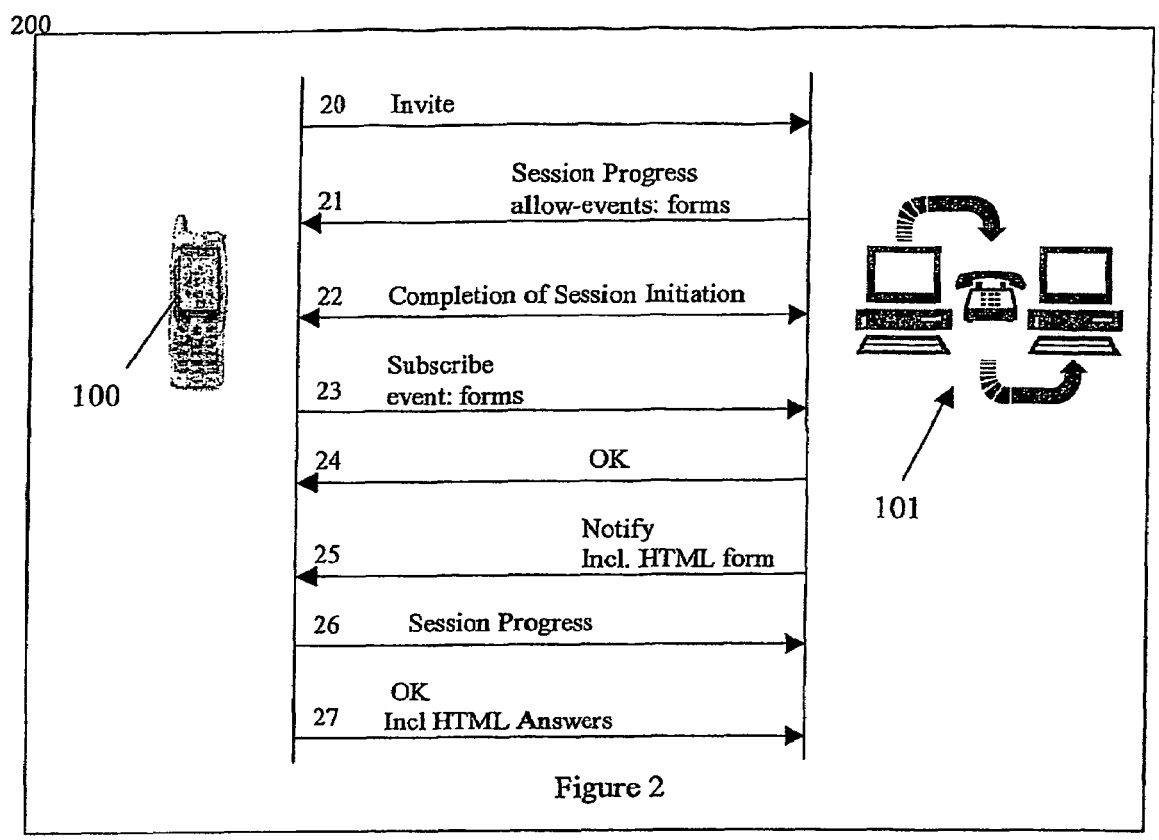
FIG. 2 is a schematic diagram illustrating how a method according to the invention can be implemented using an extension to the session initiation protocol (SIP) with integrated form transfer.

The process for this solution is shown in FIG. 2. Referring to the numbered steps in FIG. 2:

20. The Caller 100 initiates a call, this involves sending a SIP 'Invite' message to the Automated answering system.
21. The Automated answering system 101 responds with a SIP 'Session Progress' message, to confirm that the new call is being processed. This message includes the 'allow-events: forms' field that states that the call server offers the service of being able to provide forms.
22. Next, the standard Session Initiation as defined in [1] is completed, and the call becomes active.
23. The Caller sends a SIP 'Subscribe' method to state it wishes to accept forms.
24. The Automated answering system acknowledges receipt of the 'Subscribe', with a SIP 'OK' message.
25. When the user is put on hold awaiting an agent, the call server sends a SIP 'Notify' message with an HTML form attachment.
26. The Caller acknowledges it has received the form, with a 'Session Progress' Message. 27. When the form is completed it is returned as an HTML attachment to a SIP 'OK' message.

Solution 2: SIP and Another Protocol.

This solution uses SIP to set up the call between the caller and the call system, and another protocol, such as HTML or Java for the interaction of forms. This will allow a more complex interactive system, where multiple levels of forms may be negotiated or information such as product guides could be provided.

Figure 3:
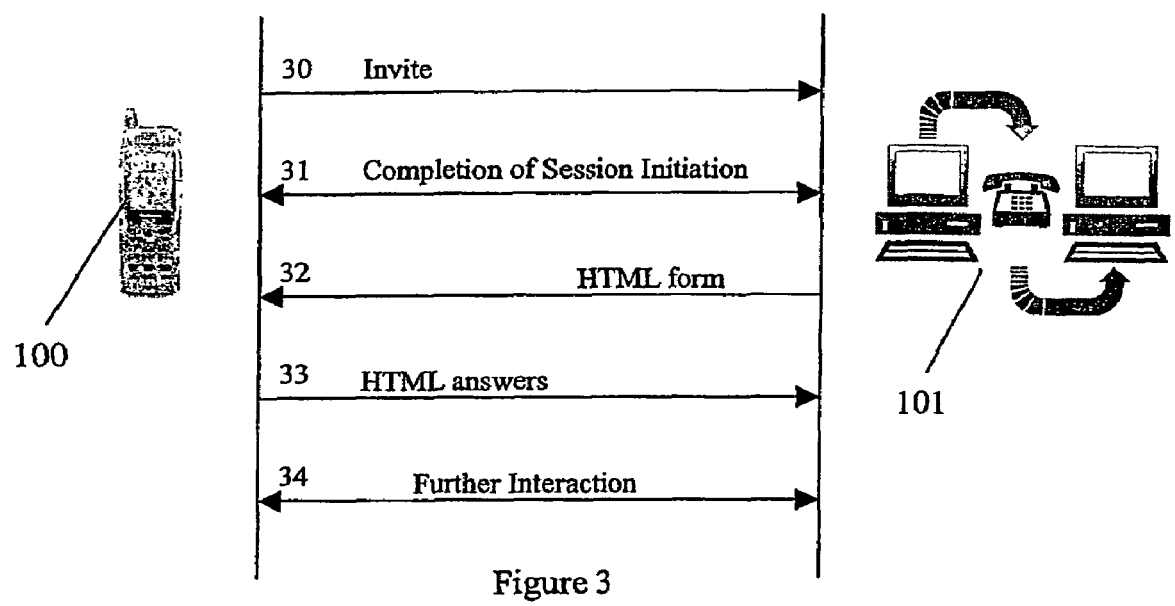
FIG. 3 is a schematic diagram similar to FIG. 2 illustrating use of the session initiation protocol (SIP) and separate form transfer.

An example, using HTML, is shown in FIG. 3. Referring to the numbered steps of FIG. 3:

30. The Caller 100 starts a call with a SIP Invite method.
31. Next, the standard Session Initiation is completed as defined in [1], and the call becomes active.
32. When the user is put on hold waiting for an agent, a form (in this case HTML) is sent to the caller.
33. The caller fills in the form and sends the reply.
34. Further forms or other multimedia data may then be exchanged.

The enhanced call queuing system described above has a number of important features as follows:

The process of call initiation and form exchange with the caller is integrated into a single end-to-end process: The basic SIP specification includes a method for initiating a call between two parties, which in our case are the caller and the call queuing system. An extension to the protocol describes how specific user 'events' can be subscribed to. We use this event to send a form, for completion by the caller, regarding their issue. We extend the use of the Event Received 'Ok' response by the caller, to also include the results of the form they filled in. This allows us to fully integrate the call initiation with the form exchange.

The call initiation and form exchange process is automated: As described above, the caller calls the queuing system and the provision of a form to the caller for completion occurs automatically.

The number and complexity of forms sent to the user, is based upon a prediction of the time it will take for the call to be answered by an agent: As described above, a calculation is made based on how busy the agents are to decide the number and complexity of forms to be sent to the caller.

The time the caller spends waiting for an agent is used to gather key information from the user.

The agent has caller information available when the call is answered: A form can be filled in and returned by the caller prior to speaking to the agent. This can enable the agent to consult databases and documents before the call is answered.

Benefits

Some of the benefits of the system include:

Saving time taken of the caller and agent by exchanging of information whilst on hold.

Saving of monotonous tasks by call agent.

Shortening of the caller queues.

Increased up-take by callers, knowing that their time is less likely to be wasted in long, unproductive queues.

Increased productivity of call centre.

Increased profitability of call centre.

Increased accuracy/reliability of data based transactions.

REFERENCES

[1] SIP Session Initiation Protocol-RFC 2543
[2] SIP Specific Event Notification-draft-ietf-sip-events-05

The invention claimed is:

1. A method of handling calls in a computer controlled call answering system for handling remote voice communications between callers and agents, in which the callers have terminals capable of handling voice signals and data, the method comprising:
    storing a number of forms of varying complexity comprising information fields for receiving data entered by the caller,
    ascertaining whether an agent is available to respond to an incoming call, if no agent is available, estimating the waiting time, selecting one of the forms on the basis of the estimated waiting time, and providing the selected form to the caller;
    capturing data entered by the caller, and
    relaying captured data to an agent;
    in which a number of forms having different information fields are stored, and in which a further form is sent to the caller following the capture of data if no agent is available to answer the call.

2. A method as claimed in claim 1 in which the captured data is relayed to an agent in response to a signal that the agent is answering or ready to answer the call.

3. A method as claimed in claim 1 including the additional step of ascertaining whether a caller's terminal is capable of downloading the form or forms.

4. A method as claimed in claim 1 in which voice signals and data are routed via the Internet using Internet Protocol.

5. A tangible computer readable medium, comprising a program for use in a computer controlled call answering system for handling remote voice communications between callers and agents, in which the callers have terminals capable of handling voice signals and data, wherein the program when run on the answering system causes the answering system to perform the method of:
    in response to a signal indicating that a call has been received and no agent is available, providing one of a plurality of forms accessible by the caller comprising information fields for receiving data entered by the caller and having a data capture program embedded therein which is run when the data is entered by the user;
    capturing data for subsequent retrieval by the handling system,
    relaying, by the handling system, the captured data to an agent in response to a signal indicating that the agent is answering the call, wherein the program includes a plurality of forms of differing complexity, and the program when run additionally causes the answering system to perform the steps of:
    ascertaining an approximate waiting time; and
    providing one of the forms to the caller, selected in dependence on the waiting time;
    wherein the providing of one of the forms to the caller is performed only if the approximate waiting time exceeds a predetermined threshold; and
    wherein the method implemented by the computer further includes providing a further form accessible by the caller following the capture of the data if the system indicates that no agent is available to answer the call.

6. The tangible computer readable medium as claimed in claim 5, wherein the method implemented by the computer further comprises relaying captured data to an agent in response to a signal that the agent is answering or ready to answer the call.

7. The tangible computer readable medium as claimed in claim 5, wherein the method implemented by the computer further comprises determining whether a caller's terminal is capable of downloading the form or forms.

8. The tangible computer readable medium as claimed in claim 5, wherein data received or sent by the answering system complies with Internet Protocol.

* * * * *